2 Sheets—Sheet 2

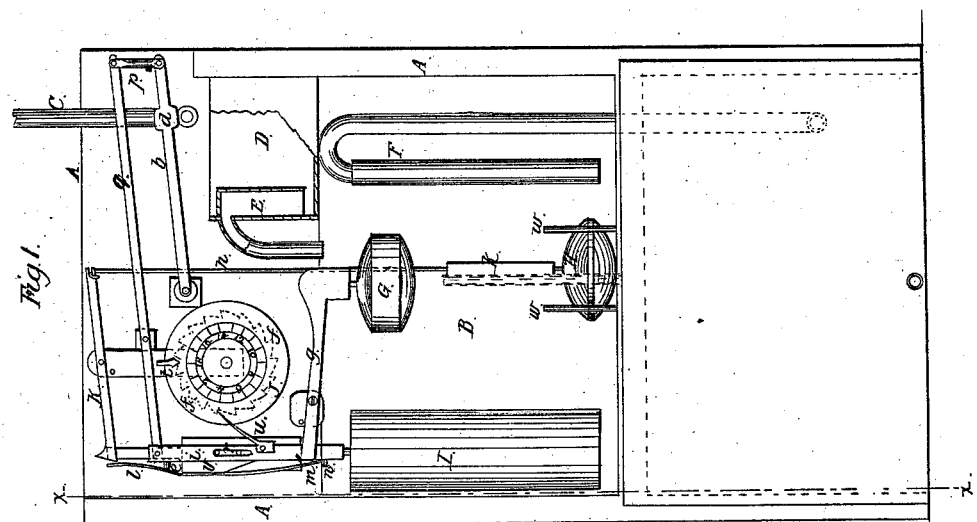

C. H. Riggs,
Piston Meter.

Nº 81,408.      Patented Aug. 25, 1868.

Witnesses:      Inventor:
W. C. Ashkettle      C. H. Riggs
J. A. Service      per Munn & Co
     Attys

N. PETERS, PHOTO-LITHOGRAPHER, WASHINGTON, D. C.

United States Patent Office.

CHARLES H. RIGGS, OF WARWICK, NEW YORK.

Letters Patent No. 81,408, dated August 25, 1868; antedated August 17, 1868.

IMPROVEMENT IN LIQUID-METERS.

*The Schedule referred to in these Letters Patent and making part of the same.*

TO ALL WHOM IT MAY CONCERN:

Be it known that I, CHARLES H. RIGGS, of Warwick, in the county of Orange, and State of New York, have invented a new and improved Automatic Liquid-Meter; and I do hereby declare that the following is a full, clear, and exact description thereof, which will enable those skilled in the art to make and use the same, reference being had to the accompanying drawings, forming part of this specification, in which—

Figure 4:
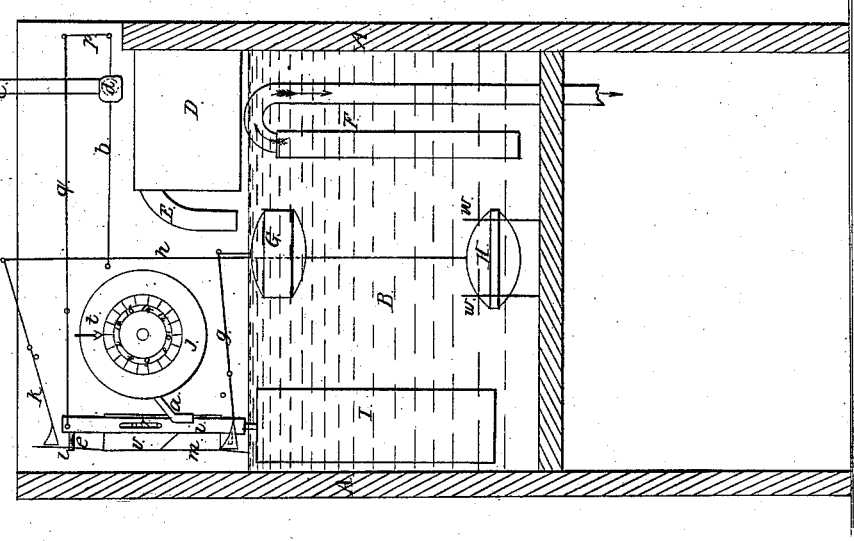
Figure 3:
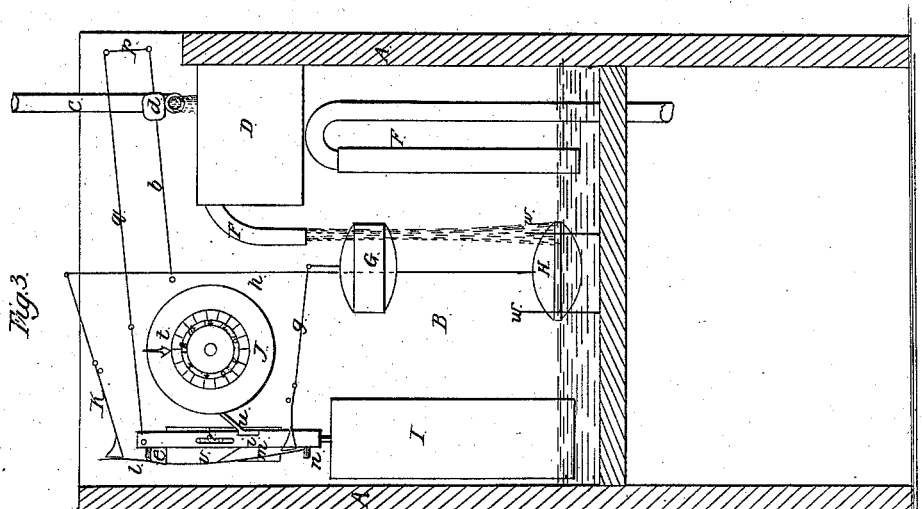

Figure 1 is a front view of my improved meter.
Figure 2 is a section of the same, through the line $x\ x$, fig. 1.
Figure 3 is a diagram view, showing the meter-tank receiving.
Figure 4 is a similar view, showing the meter-tank discharging.
Similar letters of reference indicate corresponding parts.

This invention refers to the automatic measurement of liquids, and consists of the mechanism now to be shown and described.

In the description, the measurement of water will be considered, the operation being the same for all liquids.

In the drawings, A is the body or box containing the mechanism, and forming part of the meter-tank B.

C is the receiving-pipe, which conveys the water to be measured. It discharges into a small receiving-cistern, D, from whence the water is discharged by the siphon E into the meter-tank, when it has risen to a certain height in the said cistern.

The object of this cistern is to receive the first flow of water in case the same enters before the meter-tank is entirely emptied.

When the water has risen to a certain determined height in the meter-tank, the siphon F fills and draws off the water from the meter-tank, until the level of the said water reaches the bottom of the short leg of the siphon, which will thus be a certain definite quantity of water.

The receiving-pipe C is opened and closed by a stop-valve or gate, $d$, forming part of the lever $b$, which is actuated by certain float-mechanism to open and close the said pipe, when the water in the meter-tank has attained certain determined levels, whereby a definite quantity of water is discharged at each operation.

The operation of this float-mechanism will now be described.

The float I is connected with the gate-lever $b$ by the rod $i$, lever $q$, and link $p$, as shown, and the other floats, G and H, are the means whereby the float I is disengaged from either one of the two positions, when the meter-tank is filled or emptied.

When the tank B is being filled, as shown at fig. 3, the float I is in its lower position, and is held in such position by a spring, $m$, which is affixed to the block $v$, on which the rod, $i$, to which the float I is attached, slides by means of the pins and slot, as shown at $r$.

The said spring $m$ catches above a pin, $n$, on the rod $i$, and thus prevents the float I from rising, and thereby closing the pipe C until the requisite quantity of water passes into the meter-tank.

When the water has risen in the meter-tank high enough to enter the siphon F, the float G is buoyed up, and by means of the lever $g$, to which it is attached, bears away the spring $m$, as shown at fig. 4, and permits the float I to rise and close the gate $d$.

The float I is held in its upper position by means of a pin, $e$, affixed to the rod $i$, and spring $l$, affixed to the block $v$, similarly to the spring $m$ before described.

When the float I rises, from the buoyant effect of the water, the pin $e$ catches in a hole in the said spring $l$, thereby holding the float, and consequently the gate $d$, closed, until the water in the meter-tank has been discharged by the siphon F.

When this takes place, the float H, which is connected with the lever $k$ by a rod, $h$, causes the said lever to bear off the spring $l$ and liberate the pin $e$, when the float I falls to its lower position, and, in falling, causes the before-mentioned mechanism to open the gate $d$, and permit the water to again flow from the pipe C.

The spring $l$ is now borne away from the pin $e$, and would not catch upon it as long as the lever $k$ was so held, and it is to obviate this difficulty that the float G is provided, for, after the water has risen to a certain height in the meter-tank, the float G is lifted by it, and the lever $k$ moved, so that its end is no longer in contact with the spring $l$, and this spring is thus left free to catch upon the pin $e$, when the float I rises, as before described.

This position of the lever $k$ is shown at fig. 3.

A pawl, $u$, attached to the rod $i$, serves to actuate a ratchet-wheel, $f$, at the back of, and affixed to the dial-plate J, as shown at fig. 1, so that each time the float I rises, the dial is moved a certain distance, and the face of the latter being graduated and numbered, and an index-pointer, $t$, denotes the number of times the meter-tank has been filled.

The shanks of the floats are screw-shanks, by which they can be adjusted to perform their respective offices at the proper instant, so as to measure the required quantity of water.

In fig. 3, the float H has just been lifted by the water, and the spring $l$ left free to catch upon the pin $e$ when the float I is lifted.

In fig. 4, the float G has been lifted, and the float I liberated, which latter, by rising, has closed the water-gate, as shown.

The water in the meter-tank having filled the siphon F, and thereby set it flowing, will be drawn off by the said siphon, and in subsiding, the float G will cause the end of its lever, $g$, to recede from the spring $m$, and leave it free to catch against the pin $n$, when the float I has fallen to its lower position.

The water in the meter-tank subsiding still more, falls below the float H, which causes its lever, $k$, to bear off the spring $l$ from the pin $e$, and thus permit the float I to descend, which, in so descending, causes the gate $d$ to permit the water to flow from the receiving-pipe C, as aforesaid.

Thus the meter-tank is filled and emptied by the action of siphons, and the influx of the water through the receiving-pipe is automatically controlled by floats, which are indirectly the means of opening and closing the influx-gate.

$w$ $w$ are four wires, answering as guides to the float H.

The longer leg of the siphon F discharges into a reservoir, M, the adjutage, $s$, of which should be smaller than the section of the receiving-pipe or the siphon F, so that there shall be no intermittent flowing of the water when the same is drawn off at any point beyond the reservoir M.

This reservoir is for the purpose of controlling the general operation of the meter, for the water being discharged into it will, as the reservoir fills, compress the air within the same when no water is escaping therefrom, and thereby, when a certain degree of internal pressure is reached, stop the flow of the siphon F, which holds the meter inoperative until the pressure is relieved by the escape of the water from the reservoir at $s$.

This operation of the tank may be modified by a tube, P, reaching as high as the top of the meter-tank, as shown.

This tube permits the restoration of the equilibrium in an obvious manner.

Other modifications of levers or arrangements of parts and devices have been contemplated by me, and in manufacturing meters for practical use, these said modifications and devices might be preferable, and I therefore do not wish to be understood as limiting myself to the use of the particular form of the lever-mechanism herein shown, nor the particular form or character of the water-gate $d$, as in practice other more suitable forms would occur to all skilled in the art.

This invention will be found particularly available in measuring any of the liquids of commerce, as oil, petroleum, turpentine, spirits, beer, and the like, and by practical trial it has been proven thoroughly successful.

I claim as new, and desire to secure by Letters Patent—

1. An automatic liquid-meter, having its receiving-pipe, C, opened and closed by the buoyancy and weight of a float, I, the said float being controlled in its action by the floats G and H, and the whole in combination with the siphon F, all substantially as shown and described, and for the purpose set forth.

2. The receiving-cistern D, substantially as shown and described, in combination with the meter-tank B, floats I, G, and H, the siphons E and F, as and for the purpose set forth.

3. The springs $m$ and $l$, or other equivalent device, substantially as shown and described, in combination with the float I, pins $e$ and $n$, and levers $k$ and $g$, all as and for the purpose set forth.

4. The levers $q$ and $b$, operated by the float I, substantially as shown and described, in combination with the gate $d$, pipe C, and tank B, and siphon E, all arranged as shown and described, and for the purpose set forth.

5. The ratchet $f$ and pawl $u$, substantially as shown and described, or the equivalent thereof, for the purpose of operating the registering-dial J of a meter, when in combination with the float I, rod $i$, meter-tank B, and floats G and H, all as set forth.

6. The reservoir M, substantially as shown and described, in combination with the siphon F, floats I, G, and H, and meter-tank B, as and for the purpose set forth.

The above specification of my invention signed by me, this 31st day of December, 1867.

CHARLES H. RIGGS.

Witnesses:
 WM. F. McNAMARA,
 ALEX. F. ROBERTS.